(12) United States Patent
Chung

(10) Patent No.: US 12,729,784 B2
(45) **Date of Patent: *Sep. 8, 2026**

(54) NON-METALLIC FLUID COUPLING

(71) Applicant: AdelWiggins Group, a division of TransDigm Inc., Los Angeles, CA (US)

(72) Inventor: Kevin Yun Jo Chung, Buena Park, CA (US)

(73) Assignee: AdelWiggins Group, a division of TransDigm Inc., Los Angeles, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 18/111,477

(22) Filed: Feb. 17, 2023

(65) Prior Publication Data

US 2023/0204136 A1 Jun. 29, 2023

Related U.S. Application Data

(63) Continuation of application No. 16/813,592, filed on Mar. 9, 2020, now Pat. No. 11,608,917.

(51) Int. Cl.
*F16L 25/01* (2006.01)
*F16L 25/06* (2006.01)
*F16L 25/02* (2006.01)

(52) U.S. Cl.
CPC ............... *F16L 25/01* (2013.01); *F16L 25/06* (2013.01); *F16L 25/02* (2013.01)

(58) Field of Classification Search
CPC . F16L 25/01; F16L 25/02; F16L 17/04; F16L 21/06; Y10T 292/40; Y10T 292/42; Y10T 292/438; Y10T 292/444; Y10T 292/45
See application file for complete search history.

(56) References Cited

U.S. PATENT DOCUMENTS 5,620,210 A * 4/1997 Eyster ..................... F16L 21/06 285/373
6,880,859 B2 * 4/2005 Breay ..................... F16L 25/01 285/1
9,261,211 B2 * 2/2016 Schooley ................ F16L 23/06
2009/0096209 A1 * 4/2009 Zilch ....................... F16L 25/01 285/80

(Continued)

FOREIGN PATENT DOCUMENTS

FR 2974613 A1 * 11/2012 .............. F16L 23/04

OTHER PUBLICATIONS

FR2974613 Translation (Year: 2012).*

(Continued)

*Primary Examiner* — Matthew Troutman
(74) *Attorney, Agent, or Firm* — Fulwider Patton LLP

(57) ABSTRACT

A non-metallic fluid coupling is disclosed with electrical current transferring elements incorporated therein. The coupling is formed of two C-shaped halves of non-metal, non-conducting material, where each halve includes integral hinges and latches, or hinges and latches made of a common material with the C-shaped halves. A non-metallic, substantially rigid sealing sleeve can be incorporated into the coupling to seal the coupling while maintaining the strength of the coupling.

8 Claims, 4 Drawing Sheets

(56) References Cited

U.S. PATENT DOCUMENTS

| | | | | |
|---|---|---|---|---|
| 2015/0084336 | A1* | 3/2015 | Brown | F16L 25/0036 285/419 |
| 2019/0178425 | A1* | 6/2019 | Shirsale | F16L 17/00 |

OTHER PUBLICATIONS

Emco Plastics, Peek Glass Filled, Feb. 2017, "https://web.archive.org/web/20170209123807/https://www.emcoplastics.com/peek-glass-filled/" (Year: 2017).*

* cited by examiner

NON-METALLIC FLUID COUPLING

CROSS-REFERENCES TO RELATED APPLICATIONS

This Continuation is based on U.S. Ser. No. 16/813,592, filed on Mar. 9, 2020, the content of which is incorporated herein by reference in its entirety.

FIELD OF THE INVENTION

The present invention relates generally to coupling assemblies, and more particularly to a non-metallic fluid coupling assembly using a sealing sleeve.

BACKGROUND

Coupling assemblies are used in fluid systems within multiple industries such as aerospace. Types of fluid systems include but are not exclusive to fuel or water waste systems within aircrafts. Because these systems consist of multiple tube assemblies that allow fluid transfer, they must be joined together using coupling assemblies that must create a secured seal, allow minimal flexibility within each joint, and allow electrical current to flow from one tube to the next. Without proper sealing, leakage could occur that could, in some cases such as fuel or flammable liquids, cause a catastrophic failure. The electrical current flow requires that static electricity dissipate to prevent sparks from forming within or adjacent the fluid systems.

The joints within these systems are created using two fluid tubes that are mechanically attached to ferrule adapters, a clamshell like coupling, a sealing sleeve or body, and two sealants such as O-Rings. The O-Rings are first placed within a circumferential groove on the ferrule adapters. The sealing sleeve or body is then slid over both O-Rings. The interface between the O-Rings and the sealing sleeve provides a fluidic seal in the radial direction. To keep the ferrule adapters from pulling apart in the axial direction, the clamshell coupling is placed around the ferrule adapters. The interface of the grooves that house the O-rings on the ferrule adapters and the retainer half lips on the coupling provide a seal in the axial direction. This coupling is able to remain in a closed position due to a hinge and latch mechanism that is installed onto the coupling.

Coupling assemblies are historically made from metallic materials. These metal parts are relatively heavy, vulnerable to corrosion over time, and can cause issues to an aircraft's lightning protection capabilities.

The present invention is directed to couplings and the sealing sleeves for entire coupling assemblies.

SUMMARY OF THE INVENTION

The present invention is constructed with parts that are fabricated from a non-metallic material such as plastics, composites, polymers, fiberglass or combinations of the same or like materials. For example, the retainer halves may be made from PEEK with the same interfacial dimensions as existing metallic couplings. The sealing sleeve or the body can also be made from a non-metallic material such as glass fiber with the same interfacial dimensions as the metallic sealing sleeve. Using the same interfacial dimensions allow interchangeability between components within a metallic coupling assembly and the present invention's non-metallic component. For example, a metallic coupling in a pre-existing metallic coupling assembly can be replaced by the present invention's non-metallic coupling, or a metallic sealing sleeve in a pre-existing metallic coupling assembly may be replaced by a non-metallic (e.g., glass fiber) sealing sleeve as taught herein. Replacing existing metallic components with components of the present invention allows weight savings of up to seventy percent (70%) depending on the metal or metal alloy of the component to be replaced.

The non-metallic coupling retainer halves have half cylindrical shapes and when the coupling is closed, the coupling assembly forms a near perfect cylindrical shape. These retainer halves have two lips on opposite sides that are designed to interface with ferrule adapter lips when the coupling is closed. The inner diameter of the coupling is slightly larger than the outer diameter of the sealing sleeve or body so that the sealing sleeve or body is able to fit within the coupling both axially and radially when the coupling is in the closed position.

The non-metallic coupling retainer halves may be assembled together using a single pin that is inserted into the hinges. Unlike metallic couplings that have numerous smaller components that assemble into hinge and latch mechanisms, both the hinges and latches of the present invention are incorporated into the retainer halves to reduce part count and minimize assembly time. The hinges and latches of the non-metallic coupling are preferably made from the same material as the retainer halves when not integrally formed. The combination of the integrated latch and hinge mechanisms allow the coupling to open and close like a "clam-shell."

The sealing sleeve or body may be fabricated from a non-metallic material such as glass fiber and this component provides a seal between two adjoining tubes each having ferrule adapters and O-rings. The sealing sleeve is made from a material that is relatively stiff and/or the final fabricated part is stiff with little to no flex. Each ferrule adapter has a circumferential groove formed by an inner lip and outer lip that allows the O-ring to be seated therein. The sealing sleeve has a slightly larger inner diameter than the outer diameters of the inner and outer lips of the ferrule adapters so the sealing sleeve can be installed over the combination of the O-Rings and ferrule adapters to create a fluid tight seal. The sealing sleeve provides strength from the internal pressure coming from a fluid system in the radial (hoop) direction. The combination of the O-rings or sealants and the fit of the ferrule adapters to the sealing sleeve provides flexibility within each joint.

When the coupling is closed around the assembled ferrule adapters, sealing sleeve, and O-rings, the lips of the retainer halves engage onto the ferrule adapters' outer lips and prevent the two separate ferrule adapters and tubes from separating in the axial direction.

One or more electrical contacts are formed across the coupling using bonding mechanisms that contact both tubes and allow electrical current to flow from one tube to the other. The bonding mechanisms are preferably made from an electrically conductive material including, but not exclusive to, metals. They are positioned on the surface of the coupling retainer halves in the axial direction to provide contact from one tube to another. The bonding devices are attached to the retainer halves in a way that allow the features of the retainer halves to hold the bonding tabs in place without the possibility of the bonding tabs dislodging. Overmolding and/or sonic welding are examples of manufacturing processes that will allow the retainer halves to hold the bonding tabs in place.

A benefit of the present invention is that the non-metallic couplings and sealing sleeves can be used on an existing metallic coupling assembly design. Prior art coupling designs have sought to replace the ferrule adapters with a flexible sealing sleeve that is connected or attached to the fluid tubes using an adhesive or sealant. However, because these designs do not utilize ferrule adapters and require changes to the sealing sleeve, the interfaces of such prior art couplings are less adaptive and more problematic than the present invention. The present invention allows interchangeability with existing metallic assembly components, including replacing metallic couplings or sealing sleeves with the present invention's non-metallic parts.

With a typical metallic coupling assembly, the latch and hinge mechanisms can be made from different materials due to the number of components involved. The present invention incorporates the latch and hinge mechanism into the retainer halves and the hinge mechanisms can be made from the same material as the retainer halves. The hinge and latch mechanisms are incorporated into the retainer halves through injection molding or similar manufacturing process. This improvement results in a fewer part count and less assembly time. Moreover, the present invention relies on the non-metallic material's natural flexibility for the latch/unlatching of the coupling without a metal spring, and the sealing sleeve incurs little to no flex because the material is preferably not be a flexible material. What provides flexibility or movement in the seal of the present invention is the O-Rings or sealants and the fit between the sealing sleeve and the ferrule adapters.

These and other features of the present invention will best be understood with reference to the accompanying drawings and the detailed description of the invention below.

DETAILED DESCRIPTION OF THE PREFERRED EMBODIMENTS

Figure 1:
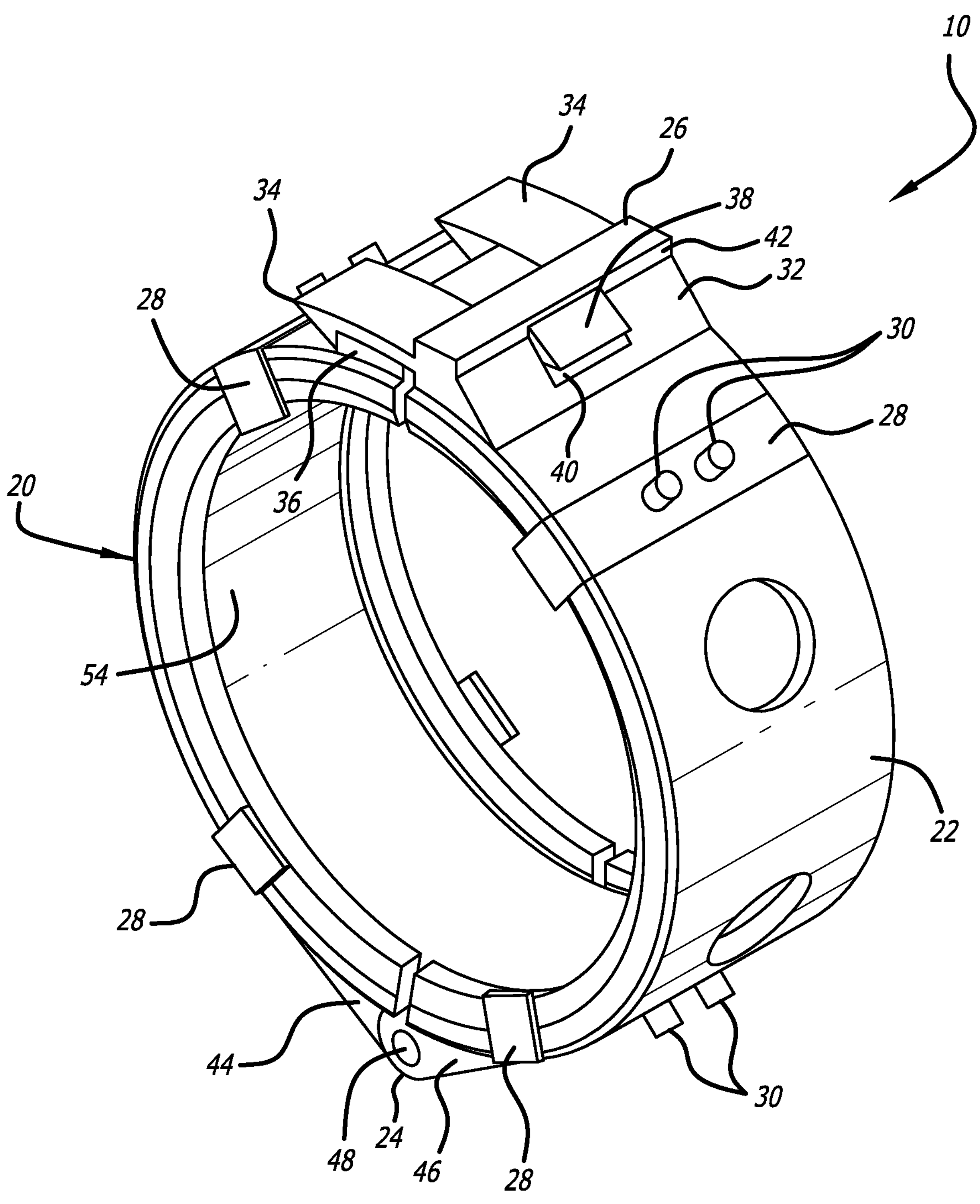
FIG. 1 is an elevated, perspective view of a first embodiment of a coupling of the present invention.
Figure 2:
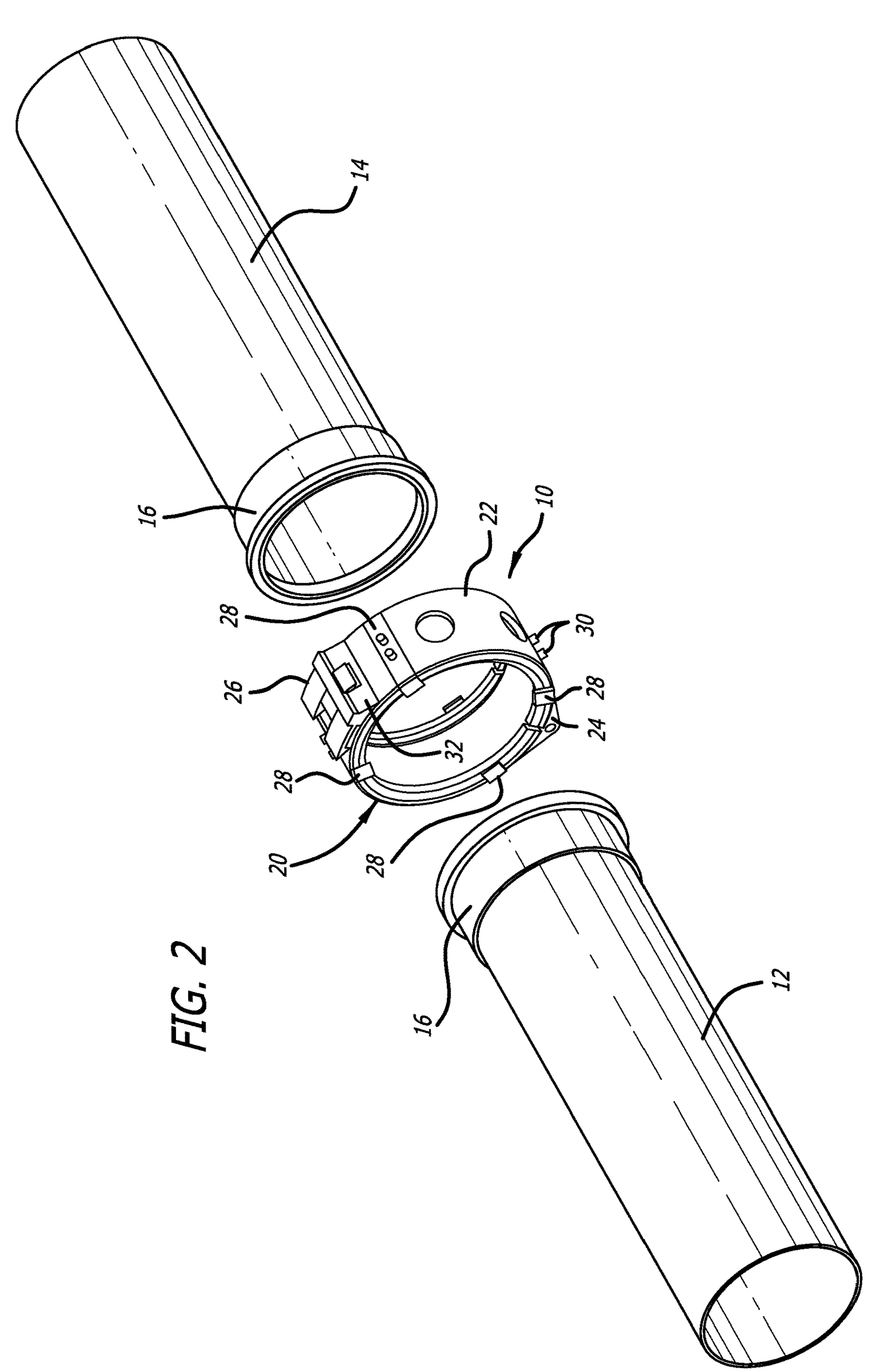
FIG. 2 is a perspective, exploded view of the coupling of FIG. 1.

FIGS. 1 and 2 illustrate a first embodiment of the present invention comprising a fluid conduit coupling 10 that mates a first tube 12 to a second tube 14. Each tube assembly 12, 14 is formed with ferrule adapters 16 that encircle the end of the tubes and are used to mate the tubes together as is well known in the art. The coupling 10 is formed by first and second C-shaped halves 20, 22 held together at one circumferential position by a hinge 24 and releasably closed at a second circumferential position by a latch 26. Four equally spaced bonding devices 28 are positioned around the coupling and each bonding is held in place by outwardly projecting bosses 30 of the retainer halves 20, 22 onto the outer surface of the retainer halves. The latching mechanism 26 includes a base 32 that may be integrally formed with second C-shaped halve 22, and from which two downwardly facing barbed projections 34 extend in a circumferential direction toward halve 20. Halve 20 includes a shoulder 36 that receives the barbed projections 34 to latch the second halve 22 to the first halve 20 as shown. Additionally, the first halve 20 may have a single upwardly facing barbed projection 38 that extends circumferentially between the barbed projections 34 passing through an aperture 40 in the base 32 to be captured on a ledge 42. The barbed projections 34, 38 are secured to the respective mating opposite halve as expansion of the diameters of the respective halves increase, thereby forcing the barbed projections to engagement with the mating surface with greater force. The halves 20, 22 can easily be released by pressing down on barbed projection 38 and lifting up on barbed projections 34 to release the contact against the ledge 42 and the shoulder 36, respectively. It is understood that other connection types are also available and part of the present invention.

The components of the hinge 24 and latch 26 can be formed integrally with the halves 20, 22 of the coupling 10 using non-metallic materials that are molded together during fabrication. That is, halve 20 can be integrally formed with hinge bearing 44, ledge 36, and upwardly facing barbed projection 38 as a single unit. Similarly, halve 22 can be formed with hinge bearing 46, base 32, and downwardly projecting barbed projections 34 as a single unit. Only pin 48 is needed to complete the assembly of the coupling 10.

Figure 3:
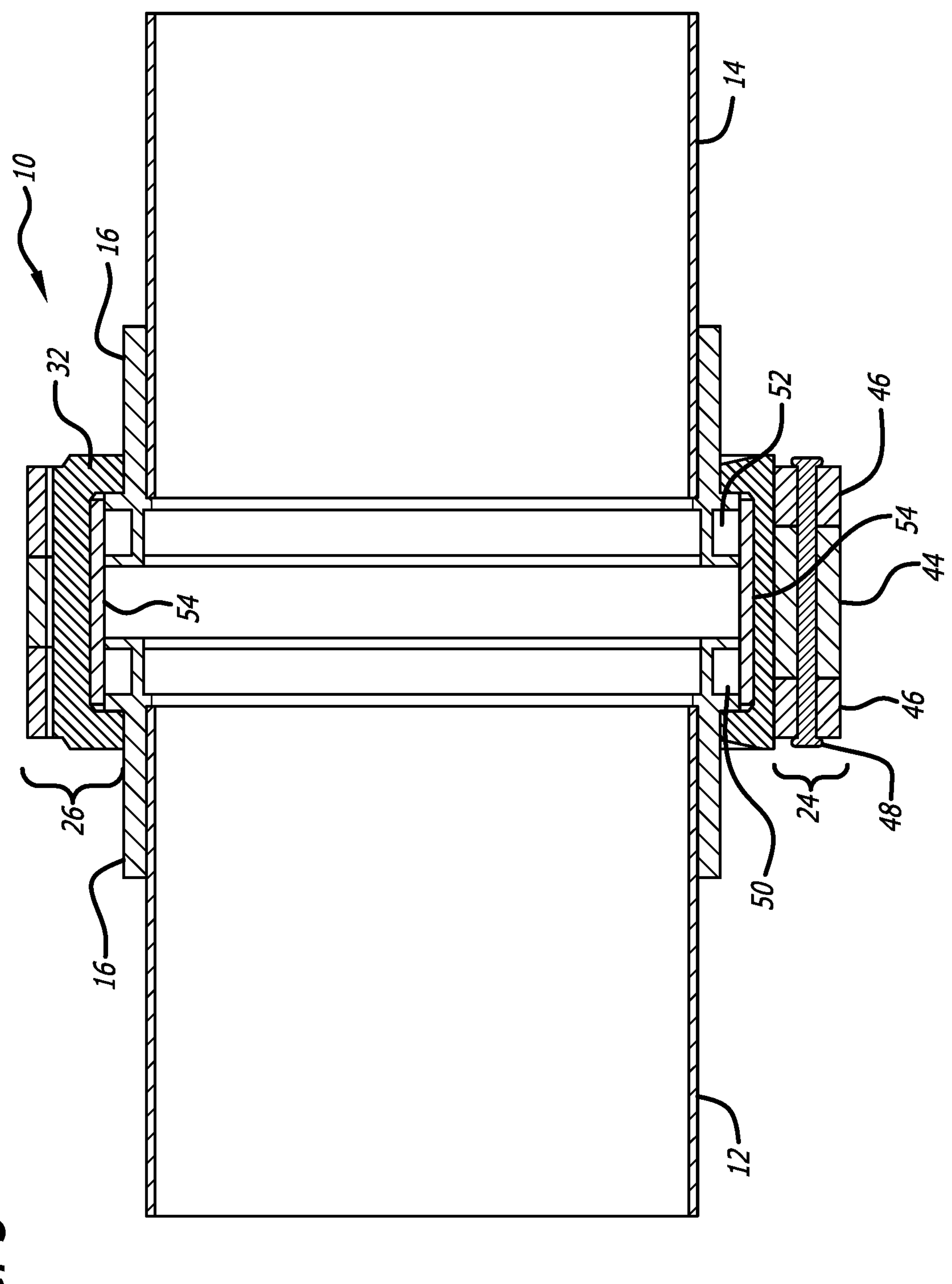
FIG. 3 is a longitudinal cross sectional view of the embodiment of FIG. 1.

FIG. 3 illustrates a first cross sectional view of the coupling 10, where first fluid tube 12 is joined to second fluid tube 14 at their respective ferrule adapters 16. Circumferential O-ring grooves 50, 52 are formed ferrule adapters 16. Each O-ring groove receives a flexible O-ring (omitted for clarity) that bears against the ferrule adapter 16 and is compressed by the sealing sleeve to prevent leakage across the seal in the radial direction. Because the hinge 24 and latch 26 are non-metallic and integral with the halves 20, 22 of the coupling, there are no electrical paths across the coupling where sparks or electrical shorts can form. The coupling 10 fits over the outer lips of the ferrule adapters 16 and the sealing sleeve 54 to capture and seal the mating tubes to provide a seal in the axial direction. This arrangement permits some flexure due to the O-ring seals and fit of the sealing sleeve, O-ring, and coupling. The seal is formed at a sealing sleeve 54 that bears against the O-ring seals that sit on the ferrule adapters 16 to prevent leakage in the radial direction. In this manner, the joint is sealed in both the radial and axial directions while allowing some flexure of the joint.

Figure 4:
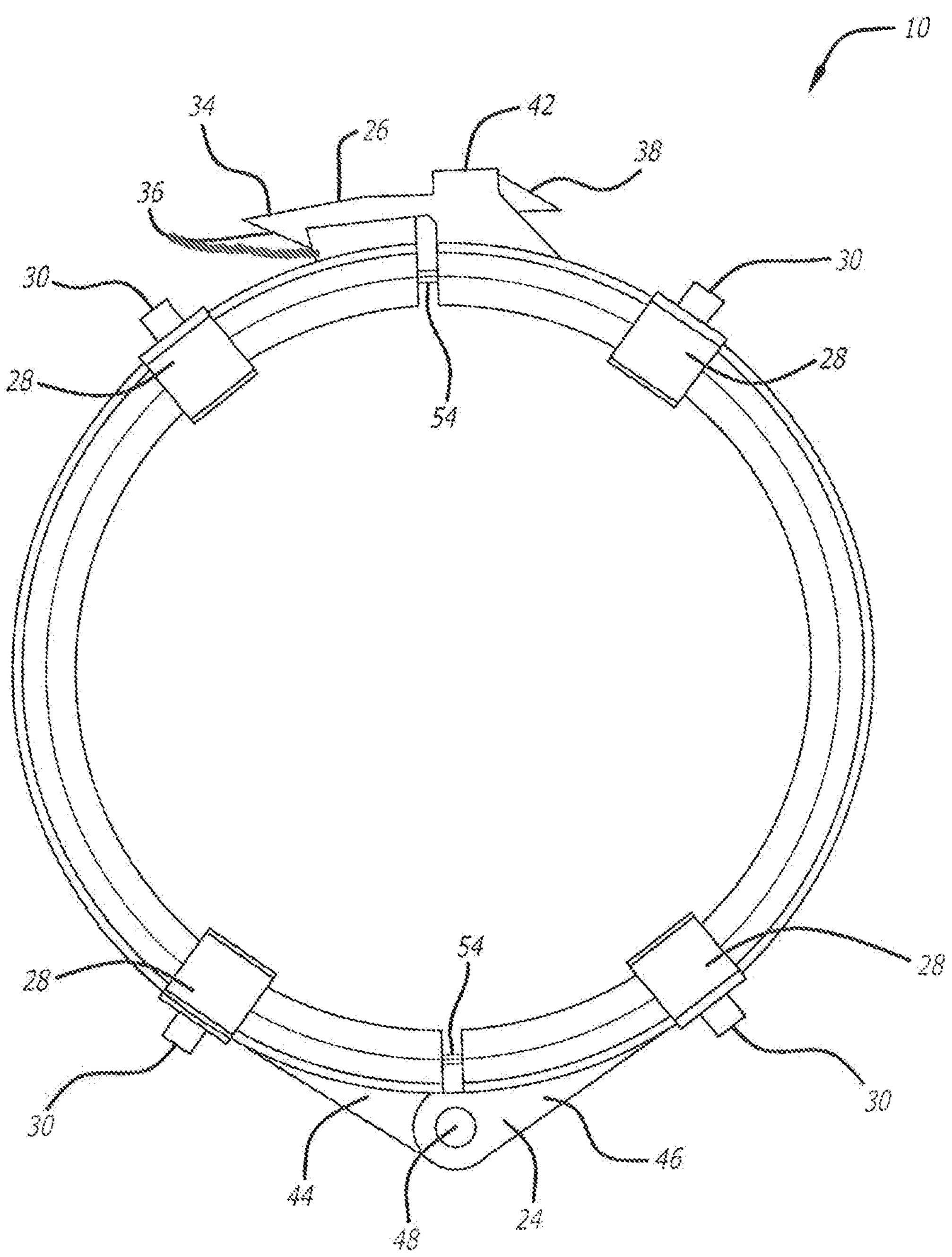
FIG. 4 is an axial cross sectional view of the embodiment of FIG. 1.

FIG. 4 illustrates a side view of the coupling 10 illustrating the integral latch 26 and integral hinge 24. Each halve 20, 22 may be fabricated from a non-metallic material such as plastics, composites, polymers, fiberglass or combinations of the same or like materials. For example, the halves 20, 22 may be made from PEEK with the same interfacial dimensions as existing metallic couplings. The sealing sleeve 54, and the halves 20,22 can also be made from a non-metallic material such as glass fiber with the same interfacial dimensions as the metallic sealing sleeve. The same interfacial dimensions allow interchangeability between components within an existing metallic coupling assembly using a replacement non-metallic coupling. For example, a metallic coupling in a pre-existing metallic coupling assembly can be replaced by the non-metallic coupling of the present invention, or a metallic sealing sleeve in a pre-existing metallic coupling assembly may be replaced by a glass fiber sealing sleeve as taught in the present invention.

The non-metallic coupling halves 20,22 are seen in FIG. 4 as having half cylindrical, or C-shapes, and when the coupling 10 is closed, the coupling assembly has a near perfect cylindrical shape. The inner diameter of the coupling 10 may be slightly larger than the outer diameter of the sealing sleeve 54 so that the sealing sleeve 54 is able to fit within the coupling both axially and radially when the coupling 10 is in the closed position as shown.

The non-metallic coupling retainer halves 20, 22 may be assembled together using a single pin 48 that is inserted into the hinge 24 at mating structures 44, 46. Unlike metallic couplings that have numerous smaller components that assemble into hinge and latch mechanisms, both the hinges 24 and latches 26 of the present invention are incorporated integrally into the retainer halves and formed as a single unit to reduce part count and minimize assembly time. In another embodiment, the hinge 24 and latch 26 of the non-metallic coupling 10 are not integral but made from the same material as the retainer halves 20,22. The combination of the latch 26 and hinge 24 cooperate to open and close the coupling 10 like a "clam-shell". Because the hinges and latches are incorporated into the retainer halves in a preferred embodiment, the retainer halves may or may not be identical as dictated by the application.

The sealing sleeve 54 may be fabricated from a non-metallic material such as glass fiber and this component provides a seal between two adjoining tubes 12, 14 each having its ferrule adapters 16 and O-rings. The sealing sleeve 54 is made from a material that is relatively stiff and/or the final fabricated part is stiff with little to no flex. The O-rings may be replaced with other sealants in certain other embodiments. The sealing sleeve 54 has a slightly larger inner diameter than the outer diameters of the ferrule adapter lips. The ferrule adapter flange outer and inner lips create a groove in which the O-ring is seated adjacent the sealing sleeve 54. The sealing sleeve can then be installed over the combination of the O-Rings and ferrule adapters 16 to create a fluid tight seal. The sealing sleeve 54 provides strength from the internal pressure coming from a fluid system in the radial (hoop) direction. The combination of the O-rings or sealants and the fit of the ferrule adapters 16 to the sealing sleeve 54 allows flexibility within each joint.

When the coupling 10 is closed around the assembled ferrule adapters 16 of respective tubes 12, 14, sealing sleeve 54, and O-rings, the "C" shaped profile and the flanges prevent the two separate ferrule adapters and tubes from separating in the axial direction. The force on the outer lips of the ferrule adapters by the retainer halves 20, 22 provides axial strength along the tube line. The coupling also provides additional sealing in the radial (hoop) direction.

The bonding mechanisms 28 contact the swage ferrules 16 that are connected to the tubes 12, 14 and allow electrical current to flow from one tube to the other. The bonding mechanisms 28 are made from an electrically conductive material including, but not exclusive to, metals. They are positioned on the surface of the coupling retainer halves 20, 22 in the axial direction to provide contact from one tube to another. Although shown with four bonding mechanisms, more or fewer can be added or subtracted without departing from the scope of the present invention. The bonding mechanisms are attached to their respective retainer halves in a way that allows the non-metallic material of the coupling 10 to mold over the bonding devices 28 to secure it in place while permitting electrical contact. The retainer halves include extruded bosses 30 that can have various shapes, sizes, and quantities that are molded or reshaped over the bonding devices to keep the bonding devices in place.

While certain embodiments have been described and depicted in this disclosure and the drawings, the invention is not intended to be limited to any specifically described or depicted embodiment. Rather, a person of ordinary skill in the art will readily appreciate and understand that many modifications and substitutions may be made within the described embodiments, and the scope of the present invention is intended to include all such modifications and substitutions. Accordingly, the scope of the invention is not limited herein unless expressly stated, and the invention's scope is properly measured by the appended claims, using their plain and ordinary meanings consistent with these descriptions and drawings.

I claim:

1. A fluid coupling for joining first and second fluid pipes each having a ferrule adapter at respective mating ends, the coupling comprising:

first and second semi-cylindrical elements cooperating to form a cylindrical coupling, the first and second semi-cylindrical elements formed of a non-metallic material, said first and second semi-cylindrical elements each having integrally formed thereon complementary interlocking hinge elements for establishing a pivoting relative motion of the first and second semi-cylindrical elements;

a pin passing through the first and second hinge elements;

a latch releasably connecting the first and second semi-cylindrical elements; and a non-metallic sealing sleeve positioned adjacent the ferrule adapter of each fluid pipe to seal the coupling;

wherein a first latch element of the latch is integrally formed with the first semi-cylindrical element and comprises a pair of barbed projections extending from the first semi-cylindrical element over a shoulder integrally formed on the second semi-cylindrical element; and wherein a second latch element of the latch is integrally formed with the second semi-cylindrical element and comprises a single barbed projection extending therefrom and passing between the pair of barbed projections on the first latch element to engage an integrally formed member of the first latch element.

2. The coupling of claim 1, wherein the single barbed projection of the second latch element passes through an aperture on the first latch element.

3. The coupling of claim 1, wherein the single barbed projection engages a lowermost edge of the integrally formed member.

4. The coupling of claim 3, wherein the single barbed projection once engaged with the lowermost edge of the integrally formed member is disengaged with the first latch element by a radially inwardly directed force.

5. The coupling of claim 4, where the first and second semi-cylindrical elements with the respective hinge elements are each molded as a single integrally formed unit.

6. The coupling of claim 1, wherein the first and second semi-cylindrical elements and the pin comprise an entire coupling.

7. The coupling of claim 1, wherein the sealing sleeve is fabricated from a glass fiber.

8. The coupling of claim 1, wherein an outer diameter of the sealing sleeve is less than an inner diameter of the semi-cylindrical elements such that the sealing sleeve can reside in the coupling in an axial and a radial dimension.

* * * * *